United States Patent [19]

Nagata

[11] Patent Number: 4,714,648
[45] Date of Patent: Dec. 22, 1987

[54] PREPREGS AND METHOD FOR PRODUCTION THEREOF

[75] Inventor: Yasuhisa Nagata, Shizuoka, Japan

[73] Assignee: Toho Rayon Co., Ltd., Tokyo, Japan

[21] Appl. No.: 761,290

[22] Filed: Aug. 1, 1985

[30] Foreign Application Priority Data

Aug. 1, 1984 [JP] Japan ................................ 59-160211
Aug. 8, 1984 [JP] Japan ................................ 59-164898

[51] Int. Cl.⁴ ..................... B32B 7/00; D04H 1/08; D02G 3/00
[52] U.S. Cl. ................... 428/245; 428/260; 428/261; 428/272; 428/273; 428/280; 428/289; 428/290; 428/361; 428/367; 428/375; 428/378; 428/392; 428/408; 525/454; 525/507; 525/523; 528/120
[58] Field of Search ............. 428/375, 378, 379, 396, 428/392, 408, 367, 361, 260, 261, 245, 272, 273, 280, 289, 290; 525/523, 507, 454; 528/120

[56] References Cited

U.S. PATENT DOCUMENTS

| | | | |
|---|---|---|---|
| 3,968,084 | 7/1976 | Yukuta et al. ...................... | 525/504 |
| 4,076,869 | 2/1978 | Flynn ................................. | 438/396 |
| 4,450,267 | 5/1984 | Ito et al. ........................... | 525/504 |
| 4,482,660 | 11/1984 | Minamisawa et al. ............. | 523/428 |
| 4,500,582 | 2/1985 | King et al. ....................... | 428/396 |
| 4,500,660 | 2/1985 | Minamisawa et al. ............. | 523/428 |
| 4,530,991 | 7/1985 | Hirai et al. ....................... | 528/123 |

FOREIGN PATENT DOCUMENTS

| | | | |
|---|---|---|---|
| 42674 | 3/1983 | Japan . | |
| 167625 | 10/1983 | Japan .................................. | 428/394 |
| 15401 | 1/1984 | Japan .................................. | 525/523 |
| 1293142 | 10/1972 | United Kingdom . | |

OTHER PUBLICATIONS

Nagata, Y., Chemical Abstracts, 105:7407h, 1986, of DE 3,527,681.
Minamizawa, T., Chemical Abstracts, 104:150138f, 1986, of J.P. 60-202116.
Toshiba Corp., Chemical Abstracts, 102:115253b, 1985, of J.P. 59-174617.
Mitsui Petrochemical Ind. Ltd., Chemical Abstracts, 99:159606t, 1983, of J.P. 58-42674.
Derwent Abstract 46831x/25 of Japanese Patent 51-050937.
Derwent Abstract 41137x/22 of Japanese Patent 51-045161.

Primary Examiner—George F. Lesmes
Assistant Examiner—S. A. Gibson
Attorney, Agent, or Firm—Sughrue, Mion, Zinn, Macpeak & Seas

[57] ABSTRACT

A prepreg obtained by impregnating fibers with an epoxy resin composition by a hot melt method is described, wherein the epoxy resin composition comprises components (A), (B), and (C), wherein (A) is an epoxy resin
(B) is a hardening agent composition containing a hydrazide type hardening agent for an epoxy resin, and having a melting point of not higher than 160° C., and
(B) further contains at least one compound selected from the group consisting of alcohols and phenols having a melting point of not less than 50° C.,
(C) is a urea compound represented by the formula

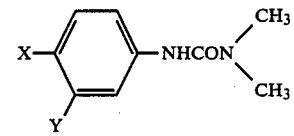

wherein X and Y each represents H, Cl, or OCH₃.

18 Claims, No Drawings

PREPREGS AND METHOD FOR PRODUCTION THEREOF

FIELD OF THE INVENTION

The present invention relates to prepregs and a method for production thereof. More particularly, it is concerned with a prepregs obtained by impregnating fibers with an epoxy resin composition having a specific composition by the hot melt method.

BACKGROUND OF THE INVENTION

In recent years, composite materials reinforced with fibers, particularly carbon fibers, have been widely used in the production of sporting goods, such as shafts of golf clubs and fishing rods. In many cases, these composite materials are used in the form of prepregs. As a matrix resin to be used in the production of prepregs, an epoxy resin is mainly used, from the viewpoint of increasing the mechanical strength.

It is known that in such epoxy resin compositions, dicyandiamide is used as a hardening agent, and urea derivatives such as dichlorophenyl-1,1-dimethylurea are used as hardening-accelerating agents, as described in U.S. Pat. No. 4,500,660. These epoxy resin compositions have a shelf life of more than one month at room temperature and are hardenable at 130° C. Thus, they are now widely used.

As low temperature hardening agents, i.e., hardening agents which allow the epoxy resin composition to polymerize at temperatures ranging between room temperature and 100° C., imidazole compounds such as 2-ethyl-4-methylimidazole and polyamines are known.

In addition, as hydrazide-based hardening agents, adipic acid dihydrazide (m.p., 180° C.), sebacic acid dihydrazide (m.p., 187° C.), isophthalic acid dihydrazide (m.p., 219° C.), malonic acid dihydrazide (m.p., 152°–154° C.), oxalic acid dihydrazide (m.p., 241° C.), succinic acid dihydrazide (m.p., 167°–168° C.), and the like are known, as described, for example, in Japanese Patent Application (OPI) No. 25700/75. (The term "OPI" as used herein refers to a published unexamined Japanese patent application.)

Epoxy resin compositions containing dicyandiamide as a hardening agent and urea derivatives such as dichlorophenyl-1,1-dimethylurea as hardening-accelerating agents, as described above, have a shelf life of more than one month at room temperature and are hardenable at 130° C. However, in cases where these epoxy resin compositions are reinforced with fibers having a small coefficient of thermal expansion, such as carbon fibers, as the molding temperature is increased, the residual stress in the ultimate molded article is increased, thereby causing problems such as cracking.

Epoxy resin compositions containing imidazole compounds such as 2-ethyl-4-methylimidazole and polyamides as hardening agents are hardenable at low temperatures, but have a disadvantage in that their shelf life is short.

Also, epoxy resin compositions using hydrazide-based hardening agents as described above have disadvantages in that temperatures higher than 150° C. are needed for molding and long periods of time are needed for hardening.

In order to overcome the above problems, and furthermore to achieve energy-saving and increase operation efficiency, it has been desired to develop a monoliquid type epoxy resin composition which can be completely hardened at a relatively low temperature and has a long shelf life.

Also, in view of the operation environment and influences exerted on the ultimate product by residual solvents, it has been desired to develop a resin composition which is suitable for use in the production of prepregs by the hot melt method without use of a solvent.

SUMMARY OF THE INVENTION

An object of the present invention is to provide a prepreg which has a long shelf life, which is quickly hardenable at lower temperatures, which is suitable for production by a hot melt method, and from which it is possible to produce fiber reinforced composites having excellent composite physical properties.

The prepreg of the present invention is obtained by impregnating fibers by a hot melt method with an epoxy resin composition containing components (A), (B), and (C), wherein (A) is an epoxy resin, (B) is a hardening agent composition containing a hydrazide type hardening agent for an epoxy resin, and having a melting point of 160° C. or less, and (C) is a urea compound represented by the following formula

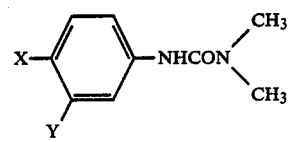

wherein X and Y each represents H, Cl, or OCH$_3$).

DETAILED DESCRIPTION OF THE INVENTION

The epoxy resin composition of the present invention is suitable, for use in the production of prepregs by the hot melt method. Hot melt methods are disclosed in, for example, in U.S. Pat. No. 4,482,660. In accordance with the present invention, adverse influences of a solvent on the working environment and also adverse influences of a residual solvent on the ultimate product as encountered in producing prepregs by the solvent method can be eliminated. Furthermore, the prepreg of the present invention has good storage stability and low temperature-hardening properties. The prepreg can be molded and hardened at a lower temperature to produce a fiber-reinforcing composite material having excellent composite physical properties.

Examples of the epoxy resin, component (A), of the epoxy resin composition of the present invention include a bisphenol A-type epoxy resin, a phenol/-novolak-type epoxy resin, a cresol/novolak-type epoxy resin, a glycidylamine-type epoxy resin, an alicyclic epoxy resin, a urethane-modified epoxy resin, and a brominated bisphenol A-type epoxy resin.

In view of composite characteristics, particularly interlaminar shear strength and bending strength, it is desirable that the amount of the novolak-type epoxy resin or bisphenol A-type epoxy resin or their mixture is at least 50 parts by weight per 100 parts by weight of the epoxy resin component.

Typical examples of the phenol/novolak-type epoxy resin among the novolak-type epoxy resins are Epikote 152, 154, 828, 834, and 1001 (trademarks for products produced by Shell Kagaku Co., Ltd.), Araldite EPN 1138 and 1139, and CY 179 (trademarks for products produced by Ciba Geigy Co., Ltd.), Dow Epoxy DEN 431, 438, 439 and 485, and XD 7855 (trademarks for products produced by Dow Chemical Co., Ltd.), EPPN 201 (trademark for product produced by Nippon Kayaku Co., Ltd.), and Epiclon N740 (trademark for product produced by Dai-Nippon Ink Kagaku Kogyo Co., Ltd.). Typical examples of the cresol/novolak-type epoxy resin are Ciba Geigy ECN 1235, 1273, 1280 and 1299 (trademarks for products produced by Ciba Geigy Co., Ltd.), and EOCN 102, 103 and 104 (trademarks for products produced by Nippon Kayaku Co., Ltd.).

Preferred examples of hydrazide compound having a melting point of 160° C. or less which can be used as the component (B) alone include

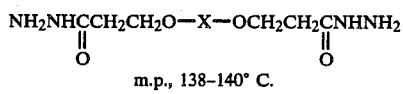   (I)

m.p., 138–140° C.

wherein X is a phenylene group

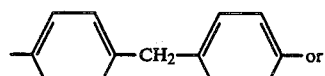

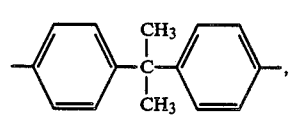,

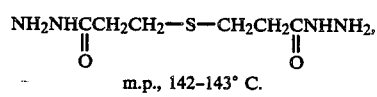   (II)

m.p., 142–143° C.

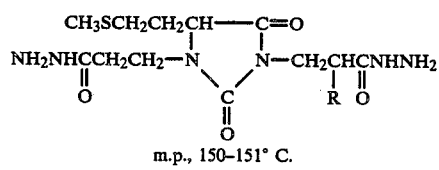   (III)

m.p., 150–151° C.

wherein R is H or CH₃,

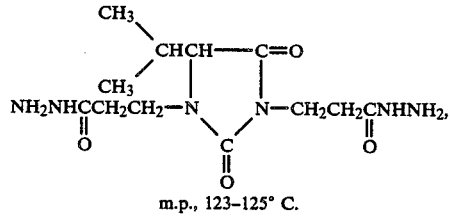   (IV)

m.p., 123–125° C.

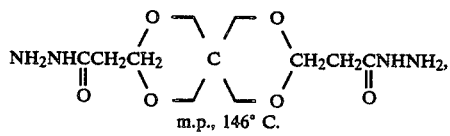   (V)

m.p., 146° C.

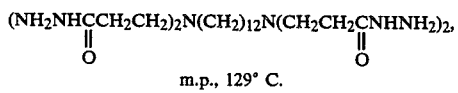   (VI)

m.p., 129° C.

and $$NH_2NHCCH_2CNHNH_2. \quad (VII)$$
$$\quad\;\, \| \quad\quad\quad \|$$
$$\quad\;\, O \quad\quad\quad O$$

m.p., 152–154° C.

The hardening agent composition may be comprised of the above described hydrazide type hardening agent and at least one of alcohol compounds and phenolic compounds having a melting point of not less than 50° C. and preferably not higher than 160° C. Such compound dissolves the hardening agent when the compound melts. The compound is used in order to further accelerate the effect of component (C).

Examples of such compounds include pyrocatechol (m.p., 105° C.) and derivatives thereof such as 2,3-dihydroxytoluene (m.p., 68° C.), resorcinol (m.p., 110° C.) and derivatives thereof such as orcinol (m.p., 107°–108° C.), hydroquinone derivatives such as 2-methylhydroquinone (m.p. 124°–125° C.), pyrogallol (m.p., 133° C.) and derivatives thereof such as pyrogallol-2-methylether (m.p., 87° C.), trimethylolpropane (m.p., 59° C.), cyclo-hexanediol (m.p., 112° C.), octanediol (m.p., 60° C.), salicyl alcohol (m.p., 86°–87° C.), naphtholic derivatives such as 2-naphthol (m.p., 122° C.), dimethyl-hexanetriol (m.p., 75° C.), and stearyl alcohol (m.p., 56°–60° C.).

When the hydrazide compound type hardening agent having a melting point exceeding 160° C., such as adipic acid dihydrazide, sebacic acid dihydrazide, isophthalic acid dihydrazide, diglycolic acid dihydrazide, tartaric acid dihydrazide, dodecanoic acid dihydrazide, malonic acid dihydrazide, oxalic acid dihydrazide, succinic acid dihydrazide, malic acid dihydrazide are used, temperatures as high as 150° C. or more are undesirably needed for hardening. Therefore, in such a case the above-described alcohol and/or phenolic compound should be used with the hardening agent to form a hardening agent composition comprising of a hardening agent and the alcohol and/or phenolic compound, so that the hardening agent composition has a melting point of not higher than 160° C.

Component (C) is a urea compound represented by the formula

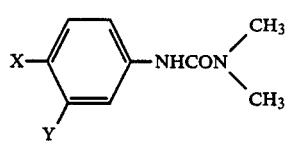

wherein X and Y (which may be the same or different) each represents H, Cl, or OCH₃.

Typical examples of the urea compound are 3-(3,4-dichlorophenyl)-1,1-dimethylurea, 3-(p-chlorophenyl)-1,1-dimethylurea, and 3-(p-methoxyphenyl)-1,1-dimethylurea.

It is only when component (B) is used in combination that the epoxy resin can be completely hardened at temperatures less than 100° C. for 2 hours. Even if a hardening agent composition having a melting point in excess of 160° C. is used in combination with component (C), such low temperature rapid hardening properties cannot be obtained.

The amount of the hardening agent is usually from 5 to 80 parts by weight, and especially preferably from 10 to 50 parts by weight, per 100 parts by weight of the epoxy resin. If the amount of the hardening agent used is less than 5 parts by weight, the resulting composition is difficult to completely harden. On the other hand, if it is in excess of 80 parts by weight, the heat resistance and water resistance of the ultimate molded article are reduced.

The amount of the hardening-accelerating agent component (C) used is usually from 0.1 to 20 parts by weight, and especially preferably from 1 to 10 parts by weight, per 100 parts by weight of the epoxy resin component (A). If the amount of component (C) used is less than 0.1 part by weight, the acceleration effect of the hydrazide compound is obtained only insufficiently. On the other hand, if it is in excess of 20 parts by weight, the water resistance of the ultimate molded article is decreased.

The weight ratio of the hardening agent to component (C) is usually from 0.5/1 to 20/1.

The useful amount of the alcohol and/or phenol compound is generally from 1 to 50 parts by weight, and preferably from 10 to 30 parts by weight per 100 parts by weight of the component (A). The weight ratio of the amount of the hardening agent to the alcohol and/or phenolic compound is preferably from 0.1/1 to 10/1, and more preferably from 0.3/1 to 5/1. When a hardening agent having a melting point of higher than 160° C. is used, the alcohol and/or phenolic compound should be used in an amount such that the melting point of the hardening agent composition (B) becomes not higher than 160° C.

Since the epoxy resin composition of the present invention is subjected to a hot melt method, the epoxy resin preferably has a viscosity of from 10 to 2,000 poises, and more preferably from 50 to 500 poises, at a temperature of 70° C. If the viscosity of the composition is in excess of 2,000 poises, it is inevitably necessary to increase the temperature of the composition in the production of prepregs by the hot melt method. If the temperature is increased, a hardening reaction starts and, as a result, the composition causes abnormal heat generation and becomes dangerous in handling. On the other hand, if the viscosity becomes less than 10 poises, the prepregs produced tends to have high tackiness at room temperature and thus are less suitable from a viewpoint of workability, for example.

When the viscosity of the epoxy resin composition of the present invention is from 10 to 2,000 poises at a temperature of 70° C., it is easy to allow the composition to impregnate to a fiber assembly in a molten state of the composition and thus the desired prepregs can be produced subsantially without the occurrence of hardening.

The viscosity is adjusted by appropriately choosing the type of the epoxy resin, the type and amount of the hardening agent, or by adding solid additives such as finely divided silicon compounds and milled fibers usually having a length of not more than 1 mm. Examples of fiber used for this purpose include carbon fiber, glass fiber, and organic fiber.

The components of the composition of the present invention are mixed by melting for which a long time of period (usually from 0.3 to 3 hours) is necessary. In order to prevent the occurrence of a hardening reaction of the composition during mixing, it is necessary to conduct mixing at a lower temperature. This temperature is generally from 20° C. to 90° C., preferably from 50° C. to 80° C., and more preferably from 60° C. to 70° C.

The epoxy resin composition of the present invention may further contain an inorganic filler, such as finely divided silica and glass microspheres, and a flame retardant, such as antimony trioxide. In addition, to impart flexibility, a nitrile rubber such as a carboxyl group-modified nitrile rubber may be added to the epoxy resin composition. Additional hardening agents, such as dicyandiamides, polyamides, imidazole compounds, diaminodiphenylsulfone, and the like can also be used in the composition, if desired. In this case, the viscosity of the resulting composition should be within the range of from 10 to 2,000 poises at a temperature of 70° C.

The preferable amount of the inorganic filler is not more than 15 wt%, that of the flame retardant is not more than 5 wt%, and that of the nitrile rubber is not more than 20 wt%, based on the total weight of the epoxy resin composition. The hardening agent other than that of component (B) may be added in an amount of not more than 5 wt% based on the total weight of the epoxy resin in the case that dicyandiamide is used as a hardening agent.

The fiber content of the prepreg is preferably from 30 to 70 wt% based on the weight of the prepreg.

Fibers which can be used in the present invention are those which are used in a conventional resin composite as a reinforcing fiber. Examples of fiber include carbon fibers, glass fibers, silicon carbide fibers, alumina fibers, and metal fibers. When carbon fibers are used, a composite material having excellent physical and mechanical properties can be obtained.

These fibers may be in shapes commonly used in the production of prepregs. For example, milled fibers, chopped fibers, unidirectional long fiber bundles, woven fabrics, knitted fabrics, felts, and nonwoven fabrics can be used.

In the production of a prepreg, the resin composition is melted and fibers are impregnated with the melted composition. The impregnation can be conducted by a conventional method. For example, the resin composition can be coated on a releasing sheet to form a thin film, generally having a thickness of from 0.005 to 0.5 mm. The reinforcing fiber is placed on the resin film usually in an amount of from 10 to 500 g/m$^2$ and impregnated with the resin composition under heating and pressing. Impregnation is usually completed within a short time, i.e., usually for from about 5 to 60 seconds. Therefore, the heating temperature may be raised up to about 120° C. or higher substantially without the occurrence of a hardening reaction. The temperature is decided such that the melted composition has a viscosity within the range of, preferably, from 0.1 to 5,000 poises, more preferably from 1 to 1,000 poises, and the most preferably from 5 to 200 poises. The heating temperature is decided depending on the nature of the resin composition. The range of the temperature is generally from about 50° C. to 120° C., and preferably from about 90° C. to 100° C. The load for pressing is usually from about 1 to 5 kg/cm$^2$. After completing the impregnation, the resin composition is cooled, and the releasing sheet is seperated from the sheet to obtain a prepreg. Such a method is disclosed, for example, in U.S. Pat. No. 4,482,660.

In the method of the present invention, unlike the production of prepregs by the solvent method, adverse influences on the working environment and adverse influences exerted on the ultimate product by residual solvent can be eliminated.

Prepregs produced by the method of the present invention have good storage stability and can be molded into composite materials by low temperature hardening. In this case, the prepregs can be completely hardened, for example, at 90° C. to 100° C. for 2 hours, or at 130° C. for 0.5 hours. Thus, the molding operation is simplified and high productivity can be obtained.

The composite material thus produced is less influenced by the residual stress because of low temperature hardening, is decreased in the number of voids as a result of viscosity behavior during hardening, and thus is of high quality.

The present invention is described in greater detail with reference to the following Examples and Comparative Examples.

In the Examples, the gel time of a resin composition is defined as the time of period necessary to reach the lowest viscosity after starting to heat the composition. (The viscosity lowers when the composition is heated and after the lapse of the gel time, the viscosity increases as the hardening reaction of the resin composition proceeds.)

The storage stability is defined in terms of the days necessary for the viscosity of the composition to reach twice that of the original composition obtained by mixing the components.

EXAMPLE 1

To 100 parts by weight of Araldite EPN 1138 were added 20 parts by weight of bisphenol A-type dihydrazide (compound represented by formula (I) shown hereinabove; produced by Ajinomoto Co., Ltd.) and a urea compound of the amount shown in Table 1, the resulting mixture was then kneaded to prepare a uniform composition. This composition was measured for hardening speeds (gel time) at 100° C. and storage stability at 30° C. The results are shown in Table 1.

TABLE 1

| Sample No. | Urea Compound | Amount (parts by weight) | Viscosity at 70° C. (poises) | Gel Time at 100° C. (minutes) | Storage Stability (days) |
| --- | --- | --- | --- | --- | --- |
| 1 | none | — | 100 | more than 60 | more than 14 |
| 2 | 3-(3,4-dichlorophenyl)-1,1-dimethylurea | 5 | 110 | 18 | more than 14 |
| 3 | 3-(p-chlorophenyl)-1,1-dimethylurea | 5 | 110 | 18 | more than 14 |

The composition was melted at 80° C. and coated on a releasing sheet to obtain a film having a thickness of 0.065 mm. After cooling the film, carbon fibers (Besphite: trademark of carbon fiber produced by Toho Beslon Co., Ltd.) were arranged in one direction to obtain a bundle of 150 g/m² and placed on the film. The sheet having the fibers thereon was hot-pressed under a load of 3 kg/cm² using a nip roller heated to 100° C. The heating time was about 20 seconds. The thus obtained unidirectional prepreg had a fiber content of 63 wt%.

EXAMPLE 2

To 100 parts by weight of Araldite EPN 1138 were added 5 parts by weight of 3-(3,4-dichlorophenyl)-1,1-dimethylurea and a hydrazide compound of the amount as shown in Table 2, and the resulting mixture was kneaded to prepare a resin composition. This resin composition was measured for hardening properties. The results are shown in Table 2.

TABLE 2

| Sample No. | Hydrazide Compound | m.p. (°C.) | Amount (parts by weight) | Viscosity at 70° C. (poises) | Gel Time at 100° C. (minutes) | Note |
| --- | --- | --- | --- | --- | --- | --- |
| 1 | Adipic acid dihydrazide | 180 | 20 | 100 | more than 30 | Comparative |
| 2 | Sebacic acid dihydrazide | 187 | 20 | 100 | more than 30 | Comparative |
| 3 | Thiosemicarbamide | 177 | 20 | 100 | more than 30 | Comparative |
| 4 | Isophthalic acid dihydrazide | 219 | 20 | 105 | more than 30 | Comparative |
| 5 | Compound of the formula (I) | 138–140 | 20 | 110 | 18 | Present Invention |
| 6 | Compound of the formula (IV) | 123–125 | 18 | 100 | 19 | Present Invention |

A prepreg was produced in the same manner as in Example 1.

EXAMPLE 3

To 70 parts by weight of Araldite EPN 1138 and 30 parts by weight of Epikote 834 were added 20 parts by weight of the hydrazide compound of the formula (I) and 5 parts by weight of 3-(3,4-dichlorophenyl)-1,1-dimethylurea, and the resulting mixture was kneaded to prepare a resin composition.

Twenty prepregs were produced in the same manner as in Example 1, laminated, and hot press molded under a load of 7 kg/cm² and the conditions shown in Table 3. A test piece was cut out from the molded plate and then measured for an interlaminar shear strength (ILSS) and a bending strength. The results are shown in Table 3.

COMPARATIVE EXAMPLE 1

A prepreg was produced in the same manner as in Example 3 except that 20 parts by weight of adipic acid dihydrazide (m.p., 180° C.) was used in place of the 20 parts by weight of the hydrazide compound of the formula (I). These prepregs were hot press molded under the same conditions as in Example 3, and the molded plate thus produced was measured for mechanical strength. The results are shown in Table 3.

COMPARATIVE EXAMPLE 2

A prepreg was produced in the same manner as in Example 3 except that 3 parts by weight of dicyandiamide was used in place of the 20 parts by weight of the hydrazide compound of the formula (I). These prepregs were hot press molded under the same conditions as in Example 3, and the molded plate thus produced was measured for a mechanical strength. The results are shown in Table 3.

TABLE 3

|  | Example 3 | | Comparative Example 1 | | Comparative Example 2 | |
| --- | --- | --- | --- | --- | --- | --- |
| Viscosity of Component (A) at 70° C. (poises) | 110 | | 100 | | 70 | |
| Molding Conditions | 100° C. 2 hours | 130° C. 30 minutes | 100° C. 2 hours | 130° C. 30 minutes | 100° C. 2 hours | 130° C. 30 minutes |
| ILSS (kg/mm$^2$) | 10.3 | 10.0 | poor hardening | poor hardening | poor hardening | 8.2 |
| Bending Strength (kg/mm$^2$) | 175 | 170 | poor hardening | poor hardening | poor hardening | 145 |
| Fiber Content (wt %) | 68 | 68 | poor hardening | poor hardening | poor hardening | 68 |

EXAMPLES 4 TO 13, AND COMPARATIVE EXAMPLES 3 AND 4

Prepregs were produced in the same manner as in Example 3 except that the formulation of the epoxy resin composition was changed, as indicated in Table 4, and, thereafter, they were hot press molded under a load of 7 kg/cm$^2$ and conditions of 100° C. and 2 hours. Molded products thus produced were measured for physical properties. The results are shown in Table 4. ("Parts" in Table 4 represents "parts by weight".)

TABLE 4

| Composition | Example 4 | Example 5 | Example 6 | Example 7 | Example 8 | Example 9 | Example 10 |
| --- | --- | --- | --- | --- | --- | --- | --- |
| Epoxy resin | | | | | | | |
| Phenol/Novolak-Type | EPN1138 100 parts | EPN1138 100 parts | EPN1138 100 parts | Epikote 152 30 parts | EPN1138 70 parts | EPN1138 70 parts | EPN1138 50 parts |
| Cresol/Novolak-Type | | | | | | ECN1235 15 parts | ECN1235 40 parts |
| Bisphenol A-Type | | | | Epikote 834 70 parts | Epikote 1001 30 parts | Epikote 1002 15 parts | |
| Alicyclic | | | | | | | Araldite CY 179 10 parts |
| Hydrazide (Hardening Agent) | Compound of formula (I) 20 parts | Compound of formula (I) 90 parts | Compound of formula (I) 20 parts | Compound of formula (I) 20 parts | Compound of formula (I) 20 parts | Compound of formula (I) 15 parts | Compound of formula (I) 16 parts |
| 3-(3,4-Dichlorophenyl)-1,1-dimethylurea | 5 parts | 5 parts | 15 parts | 5 parts | 5 parts | 5 parts | 5 parts |
| Dicyandiamine | | | | 3 parts | | | |
| Polyamide-Based Hardening Agent(*1) | | | | | | | 3 parts |
| Viscosity at 70° C. (poises) | 110 | 200 | 150 | 20 | 800 | 900 | 150 |
| Tackiness of Prepreg (room temperature)(*2) | B | A | B | B | A | A | B |
| Hardening Properties(*3) | good | good | good | good | good | good | good |
| Fiber Weight Content (wt %) | 68 | 68 | 68 | 68 | 68 | 68 | 68 |
| Coefficient of Water Absorption after 40 Hours in Boiling Water (wt %) | 0.3 | 0.7 | 0.8 | 0.4 | 0.3 | 0.4 | 0.3 |
| ILSS at 80° C. (kg/mm$^2$) | 6.8 | 5.3 | 4.0 | 6.5 | 6.8 | 6.8 | 6.5 |

| Composition | Example 11 | Example 12 | Example 13 | Comparative Example 3 | Comparative Example 4 |
| --- | --- | --- | --- | --- | --- |
| Epoxy resin | | | | | |
| Phenol/Novolak-Type | DEN485 70 parts | EPN1138 50 parts | EPN1138 80 parts | Epikote 152 70 parts | EPN1138 70 parts |
| Cresol/Novolak-Type | | ECN1235 20 parts | | | |

TABLE 4-continued

| | | | | | |
|---|---|---|---|---|---|
| Bisphenol A-Type | Epikote 834 10 parts | Epikote 834 30 parts | Epikote 828 20 parts | Epikote 834 30 parts | Epikote 834 30 parts |
| Alicyclic | Araldite CY 179 20 parts | | | | |
| Hydrazide (Hardening Agent) | Compound of formula (I) 20 parts | Compound of formula (I) 20 parts | Compound of formula (IV) 18 parts | Compound of formula (I) 20 parts | Adipic acid dihydrazide 20 parts*(*4) |
| 3-(3,4-Dichlorophenyl)-1,1-dimethylurea | 5 parts | 5 parts | 5 parts | 5 parts | 5 parts |
| Dicyandiamine | 3 parts | 3 parts | | | 3 parts |
| Polyamide-Based Hardening Agent(*1) | | | | | |
| Viscosity at 70° C. (poises) | 1,000 | 1,400 | 30 | 2(*4) | 70 |
| Tackiness of Prepreg (room temperature)(*2) | A | A | B | X | A |
| Hardening Properties(*3) | good | good | good | —(*5) | poor |
| Fiber Weight Content (wt %) | 68 | 68 | 68 | — | — |
| Coefficient of Water Absorption after 40 Hours in Boiling Water (wt %) | 0.3 | 0.3 | 0.3 | — | — |
| ILSS at 80° C. (kg/mm²) | 6.7 | 7.2 | 7.0 | — | — |

(*1)Tomide: trademark of a polyamide type hardening agent produced by Fuji Kasei K.K.
(*2)A, B and X each represents excellent, fairly good, and poor (resin flows) properties, respectively, with respect to tackiness in preparing a prepreg.
(*3)"Good" and "poor" in Hardening Properties each means hardening at 100° C. is completed within 2 hours and hardening is insufficient even after 2 hours, respectively.
(*4)The value with an asterisk is outside the range of the present invention.
(*5)A dash indicates that film could not be obtained from the composition.

EXAMPLE 14

To 70 parts by weight of Araldite EPN 1138 were added 30 parts by weight of Epikote 834, 10 parts by weight of adipic acid dihydrazide (product of Japan Hydrazine Co., Ltd.), 5 parts by weight of 3-(3,4-dichlorophenyl)-1,1-dimethylurea and a selected alcohol or phenol (for the particular type and amount used, see Table 5). Each of the mixtures was passed through a three-roll mill three times to obtain a uniform composition. The compositions were measured for cure speed at 100° C. and storage stability at 23° C. The results of these measurements are shown in Table 5.

TABLE 5

| Sample No. | Alcohol or Phenolic Compound | Gel Time at 100° C. (minutes) | Storage Stability at 23° C. (days) |
|---|---|---|---|
| 1 | none | ≧60 | 14 |
| 2 | Pyrocatechol (m.p. = 105) | 15 | 14-20 |
| 3 | Resorcinol (m.p. = 110) | 19 | 14-20 |
| 4 | Pyrogallol (m.p. = 133) | 15 | 14-20 |
| 5 | Trimethylolpropane (m.p. = 59) | 20 | 20-30 |

Note: Sample Nos. 2 to 5 were in accordance with the present invention, and sample No. 1 was a comparative sample.

EXAMPLE 15

Resin compositions were prepared by blending 70 parts by weight of Araldite EPN 1138, 30 parts by weight of Epikote 834, 5 parts by weight of 3-(3,4-dichlorophenyl)-1,1-dimethylurea, 10 parts by weight of pyrocatechol and a selected dibasic acid dihydrazide (for its type and amount, see Table 6). The cure speeds of the compositions at 100° C. are shown in Table 6.

TABLE 6

| Sample No. | Hardening Agent | M.P. of Hydrazide Compound (°C.) | Amount (parts by weight) | Gel Time at 100° C. (minutes) |
|---|---|---|---|---|
| 1 | none | — | 20 | ≧60 |
| 2 | Adipic acid dihydrazide | 180 | 20 | 15 |
| 3 | Sebacic acid dihydrazide | 187 | 20 | 18 |
| 4 | Isophthalic acid dihydrazide | 219 | 20 | 20 |
| 5 | Compound of formula (I) | 138-140 | 20 | 10 |
| 6 | Compound of formula (IV) | 123-125 | 18 | 10 |

Note: Sample Nos. 2 to 6 were in accordance with the present invention, and sample No. 1 was a comparative sample.

EXAMPLE 16

A resin composition was prepared by blending a mixture of 70 parts by weight of Araldite EPN 1138 and 30 parts by weight of Epikote 834 with 15 parts by weight of adipic acid dihydrazide, 5 parts by weight of 3-(3,4-dichlorophenyl)-1,1-dimethylurea, and 10 parts by weight of resorcinol.

Twenty sheets of prepreg were obtained in the same manner as in Example 1, and they were stacked one on another and cured by hot pressing at 100° C. for 2 hours under a load of 7 kg/cm². Test samples were cut out of the resulting shaped board and their interlaminar strengths (ILSS), bending strengths and water absorptions were measured. The results are shown in Table 7.

COMPARATIVE EXAMPLE 5

A resin composition was prepared in the same manner as in Example 16 except that resorcinol was not used. A prepreg was formed from this resin composition by the same method as used in Example 16, and samples cut out of this prepreg were hot pressed under the same conditions as used in Example 16. The results of measurements of ILSS, bending strength and water absorption for the shaped board are shown in Table 7.

COMPARATIVE EXAMPLE 6

A resin composition was prepared in the same manner as in Example 16 except that 3-(3,4 dichlorophenyl)-1,1-dimethylurea was not used. A prepreg was formed from this resin composition by the same method as used in Example 16, and samples cut out of this prepreg were hot pressed under the same conditions as used in Example 16. The results of measurements of ILSS, bending strength and water absorption for the shaped board are shown in Table 7.

EXAMPLES 17 to 23

Resin compositions were prepared using the formulations shown in Table 7, and were prepregged and shaped as in Example 16. The results of measurement of ILSS, bending strength and water absorption for the shaped boards are shown in Table 7. ("Parts" in Table 7 represents "parts by weight".)

TABLE 7

| Composition | Example 16 | Comparative Example 6 | Comparative Example 7 | Example 17 | Example 18 | Example 19 |
|---|---|---|---|---|---|---|
| Epoxy resin | | | | | | |
| Phenol/Novolak-Type | EPN1138 70 parts | EPN1138 70 parts | EPN1138 70 parts | EPN1138 70 parts | Epikote 152 20 parts | EPN1138 80 parts |
| Cresol/Novolak-Type | | | | | | ECN1235 10 parts |
| Bisphenol A-Type | Epikote 834 30 parts | Epikote 834 30 parts | Epikote 834 30 parts | Epikote 828 30 parts | Epikote 834 70 parts | |
| Alicyclic | | | | | Araldite CY 179 10 parts | Araldite CY 179 10 parts |
| Hydrazide (Hardening Agent) | adipic acid dihydrazide 15 parts | adipic acid dihydrazide 15 parts | adipic acid dihydrazide 15 parts | adipic acid dihydrazide 15 parts | isophthalic acid dihydrazide 20 parts | Compound of the formula (I) 20 parts |
| 3-(3,4-Dichlorophenyl)-1,1-dimethylurea | 5 parts | 5 parts | | 15 parts | 5 parts | 5 parts |
| Dicyandiamine | | | | | 3 parts | |
| Polyamide-Based Hardening Agent (Tomide) | | | | | | |
| Pytocatechol | | | | | 10 parts | |
| Resorcinol | 10 parts | | 10 parts | 10 parts | | |
| Pyrogallol | | | | | | |
| Trimethylolpropane | | | | | | 10 parts |
| Hardening Properties (*3) | good | poor | poor | good | good | good |
| Fiber Weight Content (wt %) | 68 | | | 68 | 68 | 68 |
| Coefficient of Water Absorption after 40 Hours in Boiling Water (wt %) | 0.3 | | | 0.8 | 0.4 | 0.3 |
| ILSS at 23° C. (kg/mm$^2$) | 9.0 | | | 8.2 | 8.0 | 9.5 |
| Bending strength at 23° C. (Kg/mm$^2$) | 160 | | | 153 | 150 | 170 |

| Composition | Example 20 | Example 21 | Example 22 | Example 23 | Example 24 | Example 25 |
|---|---|---|---|---|---|---|
| Epoxy resin | | | | | | |
| Phenol/Novolak-Type | Epikote 152 50 parts | EPN1138 90 parts | EPN1138 50 parts | | EPN1138 50 parts | EPN1138 80 parts |
| Cresol/Novolak-Type | | | | ECN1235 20 parts | ECN1235 20 parts | |
| Bisphenol A-Type | Epikote 1001 50 parts | | Epikote 831 50 parts | Epikote 834 60 parts | Epikote 828 30 parts | Epikote 828 20 parts |
| Alicyclic | | Araldite CY 179 10 parts | | Araldite CY 179 20 parts | | |
| Hydrazide (Hardening Agent) | sebacic acid dihydrazide 20 parts | adipic acid dihydrazide 15 parts | Compound of formula (II) 16 parts | Malonic acid dihydrazide 20 parts | Dodecanoic acid dihydrazide 20 parts | Compound of the formula (IV) 18 parts |
| 3-(3,4-Dichlorophenyl)-1,1-dimethylurea | 5 parts | 7 parts | 5 parts | 5 parts | 5 parts | 5 parts |
| Dicyandiamine | | | | 3 parts | 3 parts | |
| Polyamide-Based Hardening Agent (Tomide) | | | 3 parts | | | |
| Pyrocatechol | | 10 parts | | | 5 parts | |
| Resorcinol | 5 parts | | 5 parts | | | |
| Pyrogallol | 5 parts | | | | | 5 parts |
| Trimethylolpropane | | | | 10 parts | 5 parts | |
| Hardening Properties (*3) | good | good | good | good | good | good |
| Fiber Weight Content (wt %) | 68 | 68 | 68 | 68 | 68 | 68 |

TABLE 7-continued

| Coefficient of Water Absorption after 40 Hours in Boiling Water (wt %) | 0.3 | 0.3 | 0.4 | 0.4 | 0.3 | 0.3 |
|---|---|---|---|---|---|---|
| ILSS at 23° C. (kg/mm²) | 7.5 | 8.3 | 8.8 | 8.0 | 9.0 | 9.0 |
| Bending strength at 23° C. (Kg/mm²) | 150 | 157 | 160 | 160 | 165 | 165 |

(*3) indicates the same as in Table 4.

While the invention has been described in detail and with reference to specific embodiments thereof, it will be apparent to one skilled in the art that various changes and modifications can be made therein without departing from the spirit and scope thereof.

What is claimed is:

1. A prepreg obtained by impregnating fibers with an epoxy resin composition by a hot melt method, wherein the epoxy resin composition comprises components (A), (B) and (C), wherein
    (A) is an epoxy resin,
    (B) is a hardening agent composition consisting of a hydrazide type hardening agent for an epoxy resin, and having a melting point of not higher than 160° C., and (B) further contains at least one compound selected from the group consisting of alcohols and phenols having a melting point of not less than 50° C., and
    (C) is a urea compound represented by the formula

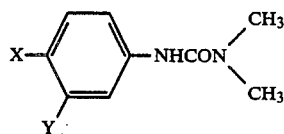

wherein X and Y each represents H, Cl, and OCH₃.

2. A prepreg as in claim 1, wherein the amounts of the components (B) and (C) are from 5 to 80 parts by weight and from 0.1 to 20 parts by weight, respectively, per 100 parts by weight of the epoxy resin.

3. A prepreg as in claim 2, wherein the weight ratio of component (B) to (C) is from 0.5/1 to 20/1.

4. A prepreg as in claim 1, wherein said at least one compound selected from the group consisting of alcohols and phenols has a melting point of not higher than 160° C.

5. A prepreg as in claim 1, wherein the amount of said at least one compound selected from the group consisting of alcohols and phenols is from 1 to 50 parts by weight per 100 parts by weight of the component (A).

6. A prepreg as in claim 5, wherein the weight ratio of the amount of the hardening agent to the amount of said at least one compound selected from the group consisting of alcohols and phenols is from 0.1/1 to 10/1.

7. A prepreg as in claim 1, wherein said epoxy resin is selected from the group consisting of a bisphenol A-type epoxy resin, a phenol/novolak-type epoxy resin, a cresol/novolak-type epoxy resin, a glycidylamine-type epoxy resin, an alicyclic epoxy resin, a urethane-modified epoxy resin, and a brominated bisphenol A-type epoxy resin.

8. A prepreg as in claim 1, wherein said hardening agent composition contains a hydrazide compound having a melting point of not higher than 160° C. as the hardening agent for the epoxy resin.

9. A prepreg as in claim 8, wherein said hydrazide compound is selected from the group consisting of $$NH_2NHCCH_2CH_2O-X-OCH_2CH_2CNHNH_2 \quad (I)$$
$$\quad \| \quad\quad\quad\quad\quad\quad\quad\quad \|$$
$$\quad O \quad\quad\quad\quad\quad\quad\quad\quad\quad O$$

wherein X represents the phenylene group

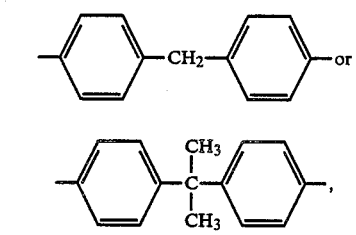

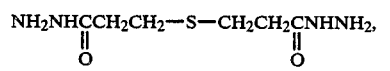

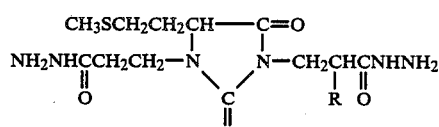

wherein R is H or CH₃,

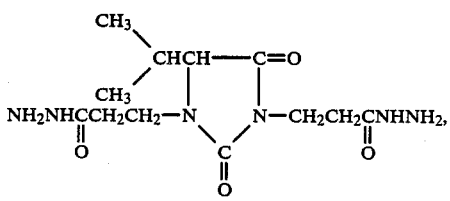

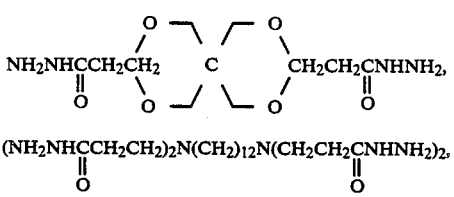

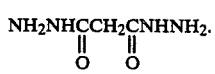

10. A prepreg as in claim 1, wherein said hardening agent composition contains a hydrazide compound having a melting point of higher than 160° C. as the hardening agent of the epoxy resin.

11. A prepreg as in claim 10, wherein the amount of said at least one compound selected from the group consisting of alcohols and phenols is such that the melting point of the hardening agent composition becomes not higher than 160° C.

12. A prepreg as in claim 11, wherein said hydrazide compound is selected from the group consisting of adipic acid dihydrazide, sebacic acid dihydrazide, diglycolic acid dihydrazide, tartaric acid dihydrazide, isophthalic acid dihydrazide, dodecanoic acid dihydrazide, malonic acid dihydrazide, oxalic acid dihydrazide, succinic acid dihydrazide, malic acid dihydrazide and derivatives thereof.

13. A prepreg as in claim 1, wherein said at least one compound selected from the group consisting of alcohols and phenols is selected from the group consisting of pyrocatechol and derivatives thereof, resorcinol and derivatives thereof, hydroquinone and derivatives thereof, pyrogallol and derivatives thereof, trimethylolpropane, cyclohexanediol, octanediol, salicyl alcohol, naphtholic derivatives, dimethylhexanetriol, tetritol, and stearyl alcohol.

14. A prepreg as in claim 1, wherein said urea compound is selected from the group consisting of 3-(3,4-dichlorophenyl)-1,1-dimethylurea, 3-(p-chlorophenyl)-1,1-dimethylurea, and 3-(p-methoxyphenyl)-1,1-dimethylurea.

15. A prepreg as in claim 1, wherein the viscosity of said epoxy resin is from 10 to 2,000 poises at 70° C.

16. A prepreg as in claim 1, wherein said fibers are selected from the group consisting of carbon fibers, glass fibers, silicon carbide fibers, alumina fibers, and metal fibers.

17. A prepreg as in claim 1, wherein said fibers are in a form of milled fibers, chopped fibers, unidirectional fiber bundles, woven fabrics, knitted fabrics, felts, or nonwoven fabrics.

18. A prepreg as in claim 1, wherein said phenol is capable of dissolving the hardening agent when said phenol melts.

* * * * *